No. 862,743. PATENTED AUG. 6, 1907.
P. E. LARSON.
MACHINE FOR REMOVING INSECTS FROM PLANTS.
APPLICATION FILED MAR. 28, 1907.
2 SHEETS—SHEET 1.
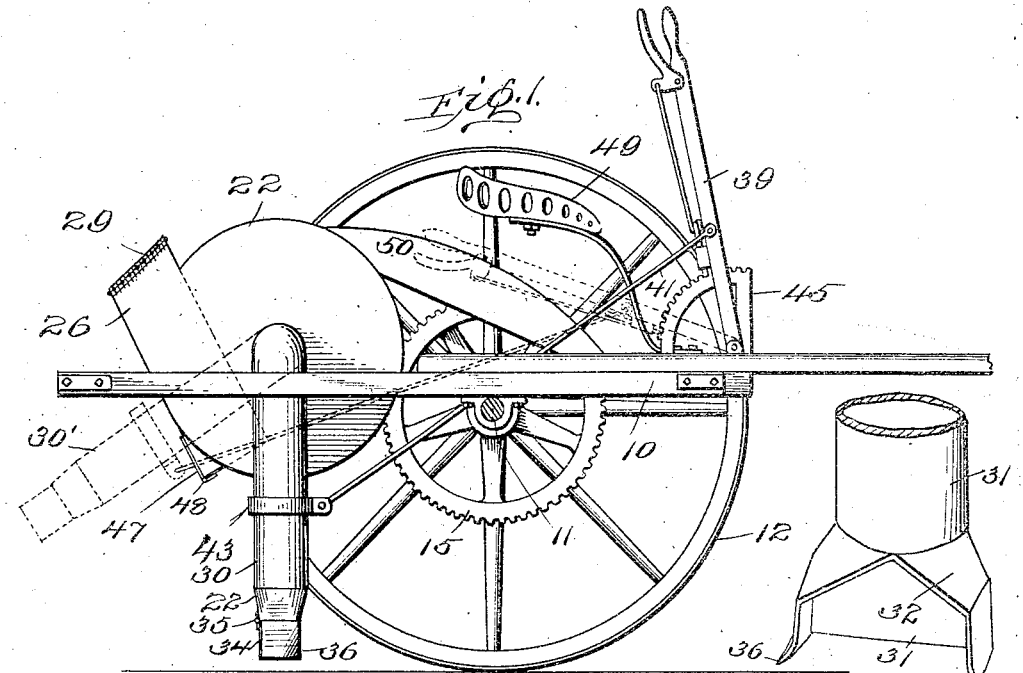
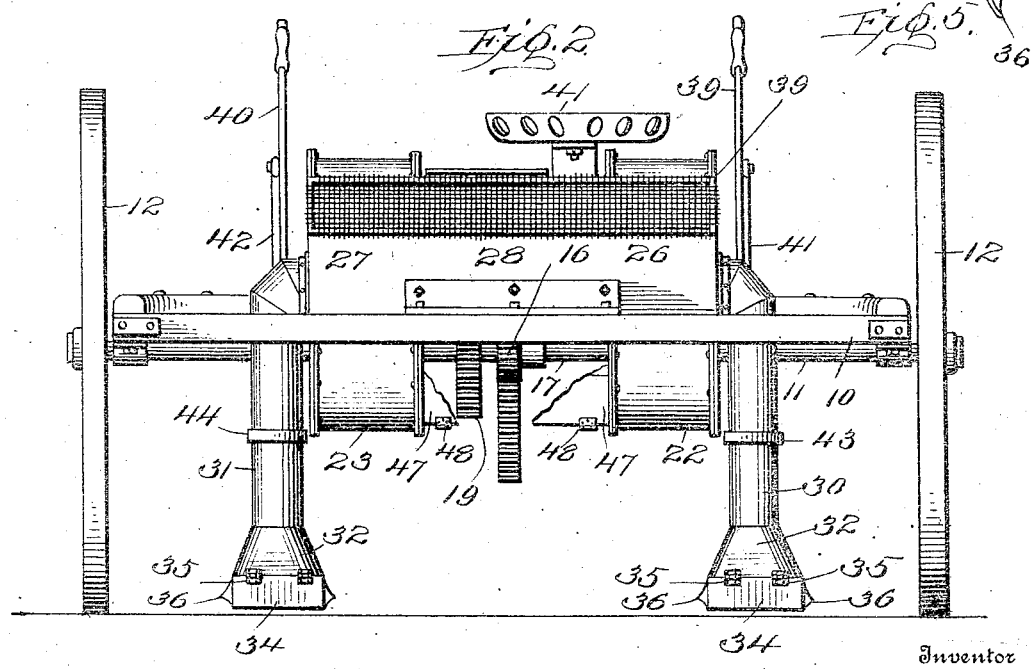
Witnesses
J. M. Fowler Jr.
L. D. Morrill
Inventor
Peter E. Larson
By Mason Fenwick & Lawrence
Attorneys No. 862,743. PATENTED AUG. 6, 1907.
P. E. LARSON.
MACHINE FOR REMOVING INSECTS FROM PLANTS.
APPLICATION FILED MAR. 28, 1907.
2 SHEETS—SHEET 2.
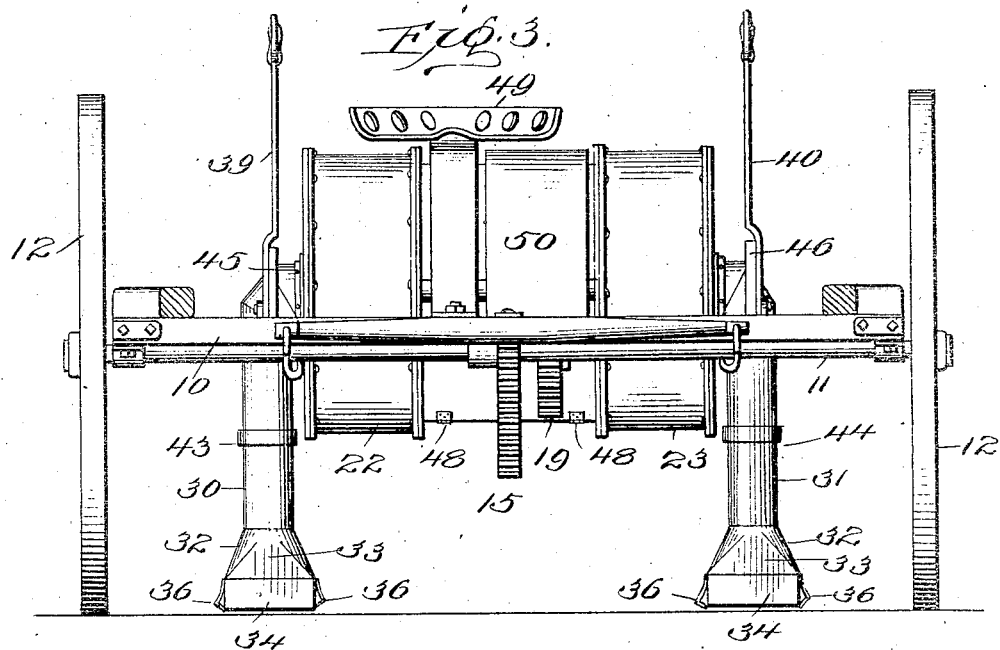
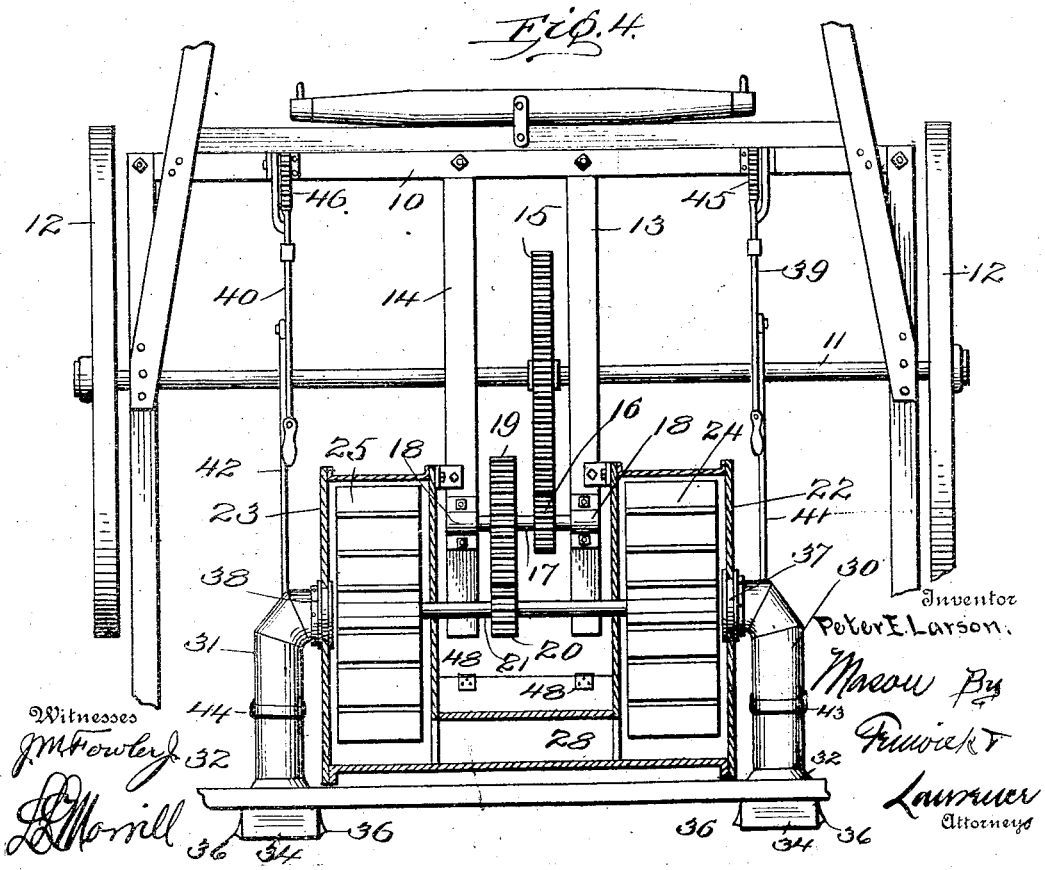
Inventor
Peter E. Larson,
Witnesses

UNITED STATES PATENT OFFICE.

PETER E. LARSON, OF IOLA, WISCONSIN.

MACHINE FOR REMOVING INSECTS FROM PLANTS.

No. 862,743.

Specification of Letters Patent.

Patented Aug. 6, 1907.

Application filed March 28, 1907. Serial No. 365,022.

*To all whom it may concern:*

Be it known that I, PETER E. LARSON, a citizen of the United States, residing at Iola, in the county of Waupaca and State of Wisconsin, have invented certain new and useful Improvements in Machines for Removing Insects from Plants, of which the following is a specification.

This invention relates to insect removers, and has for an object to provide a device embodying improved means for removing insects from plants and other vegetable growth.

A further object of the invention is to provide in an insect gatherer a wheeled carriage upon which is mounted centrifugal fans and with improved means connected with the fans for gathering insects from plants and also improved means for depositing the gathered insects in a receptacle.

A further object of the invention is to provide in an insect destroyer depending tubes adapted for engagement with growing plants, and with improved means for swinging the tubes out of operative position.

With these and other objects in view, the invention comprises certain novel constructions, combinations and arrangements of parts, as will be hereinafter fully described and claimed.

In the drawings:—Figure 1 is a view of the improved insect gatherer in side elevation. Fig. 2 is a view in rear end elevation of the insect gatherer showing the insect receptacle and closure broken away to exhibit the gearing. Fig. 3 is a view of the insect gatherer in front end elevation. Fig. 4 is a top plan view of the insect gatherer with the fan housing and insect receptacle shown in section and the gathering tubes shown out of operative position. Fig. 5 is an enlarged detail perspective view of the lower open end of one of the suction tubes.

Like characters of reference designate corresponding parts throughout the several views.

The improved insect gatherer forming the subject-matter of this application may be mounted upon any approved form of vehicle as shown conventionally by the frame 10, beneath which is journaled the axle 11, and mounted upon wheels 12, which said wheels are connected with the axle in the usual well known manner, so that the axle rotates with the wheels.

Intermediate the side frame pieces may be mounted frame pieces 13 and 14, spaced apart to permit the movement therebetween of a gear wheel 15 rigidly mounted upon the axle 11 and intergeared with a pinion 16, mounted upon a counter shaft 17 journaled as in the boxes 18, mounted upon the frame pieces 13 and 14.

Upon the counter shaft 17 is rigidly mounted a gear 19 which in turn intergears with a pinion 20 carried upon a shaft 21. The shaft 21 extends through and is journaled in the side walls of the fan housings 22 and 23, within which are mounted fans 24 and 25, respectively, rigidly upon the ends of the shaft 21.

At the rearward side the fan housings 22 and 23 are provided with upwardly directed chutes 26 and 27, connected by means of a receptacle 28 disposed between the fan housings and communicating therewith. The upper end of the chutes 26 and 27 and the upper side of the receptacle 28 are formed open and are covered by a screen 29 so that the current of air set in motion by the fans 24 and 25 may be discharged through the chutes without interference, but any object carried by the current of air impinges upon the screen 29 and is retained thereby.

Centrally of the housings 22 and 23 tubes 30 and 31 are mounted communicating with the said housings and provided at their lower ends with outwardly flared or funnel-shaped portions 32 open as at 33 upon the forward side and closed at the rearward side by a cover member 34 hinged as by the hinges 35 to permit the said cover member 34 to be swung backwardly, as the vehicle advances and in response to a pressure inserted thereupon by the standing plants. The sides of the funnel-shaped member 32 are also preferably flared outwardly or diverged as shown at 36 to embrace and gather in the plants more widely distributed.

The tubes 30 and 31 are preferably connected with the housings 21 and 22 respectively, by means of swivel joints 37 and 38 whereby the tubes may move angularly to the positions shown in full and dotted lines in Fig. 1 responsive to a movement of levers 39 and 40, communicated through links 41 and 42, and connected with the tubes in any approved manner as by means of the collars 43 and 44 embracing the said tubes. The positions of the tubes 30 and 31 about their pivot points are controlled and adjusted by means of the said levers 39 and 40 engaging segmental racks 45 and 46 engaged by the pawl carried by the lever in the usual well known manner.

The insect receptacle 38 is preferably provided with a cover member or closure 47 hinged as by the hinges 48 to the rearward and lower side of the receptacle so that the said closure 47 may be swung outwardly and the insects and other objects contained in the said receptacle dumped.

Upon the vehicle may be mounted the customary and usual seat 49 for the accommodation of the driver, and a guard-housing 50 may be employed to cover the gear beneath the seat 49 to protect the driver from accidental engagement therewith.

In operation the apparatus will be employed as shown in Fig. 1 with the tubes 30 and 31 depending below the fan housings and in position to engage with the rows of standing plants as the vehicle is driven through the field. The movement of the vehicle transmitted through the wheels and the gear cause rapid rotary movement of the fans and by centrifugal force creating a rarification in the tubes 30 and 31 by reason of which the insects upon the plants encountered by the tubes 30 and 31 are drawn upwardly through the tubes and discharged against the screen 29 and from there drop into the receptacle 28 as the current of air is directed only to the screen which covers the chutes 26 and 27.

When the receptacle 28 has been filled to the desired degree the closure 47 is opened and the contents of the receptacle dumped as circumstances may make desirable.

When the device is to be moved from place to place and not in operation, the tubes 30 and 31 are moved to the position shown at 30' in dotted lines in Fig. 1 and as shown in Fig. 4.

What I claim is:—

1. In an insect gatherer, a wheeled vehicle, a fan housing mounted upon the vehicle, a fan mounted to rotate within the housing, means to transmit motion from the vehicle to the fan, a tube depending from the fan housing, an outwardly flaring extremity formed upon the tubing, and a hinged plate forming a portion of the flaring extremity.

2. In an insect gatherer, a vehicle, a rotating fan carried by the vehicle, a housing embracing the fan, a tube communicating with the housing centrally of the fan and depending from the vehicle, a flaring extremity formed upon the lower end of the tube and embodying an open forward side, and a hinged plate forming the rearward side of the flared extremity.

3. In an insect gatherer, an exhaust mechanism, a tube depending from and in communication with the exhaust mechanism, a flared extremity formed upon the lower end of the tube and provided with an open forward side, and a plate hinged to and forming the rear side of the flared extremity.

In testimony whereof I have signed my name to this specification in the presence of two subscribing witnesses.

PETER E. LARSON.

Witnesses:
 THEO. KROSTEN,
 M. H. O'BRIEN.